US012729411B2

(12) United States Patent
Lee et al.

(10) Patent No.: US 12,729,411 B2
(45) Date of Patent: Sep. 8, 2026

(54) DOUBLE-ORIENTED ELECTRICAL STEEL SHEET, AND METHOD FOR PRODUCING SAME

(71) Applicant: POSCO, Pohang-si (KR)

(72) Inventors: Se Il Lee, Gyeongsangbuk-do (KR); Hyunwoo Mun, Gyeongsangbuk-do (KR)

(73) Assignee: POSCO, Pohang-si (KR)

(*) Notice: Subject to any disclaimer, the term of this patent is extended or adjusted under 35 U.S.C. 154(b) by 765 days.

(21) Appl. No.: 17/784,379

(22) PCT Filed: Dec. 17, 2020

(86) PCT No.: PCT/KR2020/018611
§ 371 (c)(1),
(2) Date: Jul. 20, 2022

(87) PCT Pub. No.: WO2021/125857
PCT Pub. Date: Jun. 24, 2021

(65) Prior Publication Data

US 2023/0060392 A1 Mar. 2, 2023

(30) Foreign Application Priority Data

Dec. 19, 2019 (KR) ........................ 10-2019-0170756

(51) Int. Cl.

| | |
|---|---|
| ***C22C 38/00*** | (2006.01) |
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C21D 9/46*** | (2006.01) |
| ***C22C 38/02*** | (2006.01) |
| ***C22C 38/04*** | (2006.01) |
| ***C22C 38/06*** | (2006.01) |

(Continued)

(52) U.S. Cl.
CPC ............... *C21D 9/46* (2013.01); *C21D 6/005* (2013.01); *C21D 6/008* (2013.01); *C21D 8/1222* (2013.01);
(Continued)

(58) Field of Classification Search
CPC .......... C21D 9/46; C21D 6/005; C21D 6/008; C21D 8/1222; C21D 8/1272;
(Continued)

(56) References Cited

U.S. PATENT DOCUMENTS 5,370,748 A 12/1994 Suga et al.
6,562,473 B1 5/2003 Okabe et al.
(Continued)

FOREIGN PATENT DOCUMENTS

CN 1308143 A 8/2001
CN 103827333 A 5/2014
(Continued)

OTHER PUBLICATIONS

Patent Family for JP 6315158 B1 (Year: 2025).*
(Continued)

*Primary Examiner* — Vanessa T. Luk
(74) *Attorney, Agent, or Firm* — Morgan Lewis & Bockius LLP

(57) ABSTRACT

A double-oriented electrical steel sheet according to an example of the present invention comprises, by weight 2.0 to 4.0 wt % of Si, 0.01 to 0.04 wt % of Al, 0.0004 to 0.02 wt % of S, 0.05 to 0.3 wt % of Mn, at most 0.01 wt % (exclusive of 0 wt %) of N, at most 0.005 wt % (exclusive of 0 wt %) of C, 0.005 to 0.15 wt % of P, 0.001 to 0.005 wt % of Ti, and 0.0001 to 0.005 wt % of Mg, with the balance being Fe and other inevitable impurities, wherein the area fraction of crystal grains having an orientation within 15° from {100}<001> is 60 to 99%, and the area fraction of crystal grains having an orientation within 15° from {100}<025> is 1 to 30%.

8 Claims, 1 Drawing Sheet

100

(51) Int. Cl.
*C22C 38/14* (2006.01)
*H01F 1/147* (2006.01)

(52) U.S. Cl.
CPC ......... *C21D 8/1272* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *H01F 1/14775* (2013.01); *C21D 2201/05* (2013.01); *C22C 2202/02* (2013.01)

(58) Field of Classification Search
CPC .... C21D 8/1283; C21D 2201/05; C21D 1/26; C21D 1/68; C21D 1/74; C21D 1/76; C21D 3/04; C21D 8/1205; C21D 8/1233; C21D 8/1244; C21D 8/1255; C21D 8/1261; C21D 8/1277; C21D 8/1288; C21D 8/0226; C21D 8/0273; C22C 38/001; C22C 38/002; C22C 38/02; C22C 38/04; C22C 38/06; C22C 38/14; C22C 2202/02; C22C 38/004; C22C 38/008; C22C 38/12; C22C 38/60; H01F 1/14775; Y02P 10/20; B21B 1/24; B21B 3/00
See application file for complete search history.

(56) References Cited

U.S. PATENT DOCUMENTS

| | | | | |
|---|---|---|---|---|
| 2003/0116236 | A1 * | 6/2003 | Hayakawa | C21D 8/1272 148/516 |
| 2020/0283867 | A1 * | 9/2020 | Kaminaka | C23G 1/081 |
| 2021/0054474 | A1 * | 2/2021 | Lee | C21D 8/1272 |
| 2021/0381073 | A1 * | 12/2021 | Lee | C21D 8/1277 |

FOREIGN PATENT DOCUMENTS

| | | | | |
|---|---|---|---|---|
| JP | 2001-247944 A | | 9/2001 | |
| JP | 2005-179745 A | | 7/2005 | |
| JP | 2006-241503 A | | 9/2006 | |
| JP | 2007-031793 A | | 2/2007 | |
| JP | 2007-262519 A | | 10/2007 | |
| JP | 2008-106367 A | | 5/2008 | |
| JP | 2013-060653 A | | 4/2013 | |
| JP | 2014-196559 A | | 10/2014 | |
| JP | 2017-106057 A | | 6/2017 | |
| JP | 6315158 B1 | * | 4/2018 | C21D 8/0226 |
| JP | 2019-506528 A | | 3/2019 | |
| KR | 10-1719232 B1 | | 3/2017 | |
| KR | 10-2018-0045504 A | | 5/2018 | |
| KR | 10-2018-0073323 A | | 7/2018 | |
| KR | 10-2019-0078166 A | | 7/2019 | |
| KR | 10-2020-0035753 A | | 4/2020 | |
| WO | 2019/132363 A1 | | 7/2019 | |
| WO | WO-2020067721 A1 | * | 4/2020 | C21D 1/76 |

OTHER PUBLICATIONS

Patent Family for WO 2019132363 A1 (Year: 2025).*
Japanese Office Action dated Sep. 19, 2023 issued in Japanese Patent Application No. 2022-537561.
Chinese Office Action dated Feb. 18, 2023 issued in Chinese Patent Application No. 202080095882.8.
The Extended European Search Report dated May 6, 2024 issued in European Patent Application No. 20900823.4.
International Search Report (with partial English translation) and Written Opinion dated Apr. 27, 2021 issued in International Patent Application No. PCT/KR2020/018611.

* cited by examiner

DOUBLE-ORIENTED ELECTRICAL STEEL SHEET, AND METHOD FOR PRODUCING SAME

CROSS-REFERENCE OF RELATED APPLICATIONS

This application is the U.S. National Phase under 35 U.S.C. § 371 of International Patent Application No. PCT/KR2020/018611, filed on Dec. 17, 2020, which in turn claims the benefit of Korean Application No. 10-2019-0170756, filed on Dec. 19, 2019, the entire disclosures of which applications are incorporated by reference herein.

TECHNICAL FIELD

An exemplary embodiment of the present invention relates to a double-oriented electrical steel sheet and a method for producing the same. Specifically, an exemplary embodiment of the present invention relates to a double-oriented electrical steel sheet having excellent magnetism in a rolling direction and a rolling vertical direction by appropriately controlling contents of Ti, Mg, and Ca in an alloy composition and adjusting rolling conditions to increase a fraction of crystal grains having {100}<001> orientation, and a method for producing the same.

BACKGROUND ART

In order to improve a magnetic flux density of an electrical steel sheet, it is known as the most effective method to improve the texture of a steel to align a <100> axis in parallel with a magnetization direction, and further, a method of decreasing an alloyed amount of a steel to improve a fraction of a Fe atom in the steel, thereby bringing a saturation magnetic flux closer to that of pure iron to improve the magnetic flux density is used. Among them, a directional electrical steel sheet uses a {110}<001> orientation called Goss orientation, and is usually obtained by a process of decarburizing-nitrifying-secondary high temperature annealing in slab-hot rolling-hot rolled plate annealing-cold rolling-primary recrystallization. However, since it has excellent magnetism only in a rolling direction (Rd direction) and extremely poor magnetism in a rolling vertical direction (TD direction), it is difficult to use the directional electrical steel sheet except for a transformer of which the magnetism direction is determined as a rolling direction. Thus, it is required to produce an electrical steel sheet in which a texture having a magnetization direction and a <100> axis in parallel is controlled by a texture different therefrom.

Since the magnetization direction in a rotating machine is usually rotated in a plate surface, a <100> axis should be parallel to the plate surface, and an orientation which is often observed in steel materials under the conditions is a {100}<011> orientation. Since the <100> axis is parallel to a direction bent at 45° from a rolling direction the rolling vertical direction (TD direction), magnetism is best when the magnetization direction is 45° from the rolling direction of a plate. However, since the orientation all disappears when recrystallization annealing in a cold rolling stable orientation, it is not used in electrical steel sheet materials.

Similarly, there is a {100}<001> orientation, which has a cube orientation and has been recognized for its usefulness in the past, however, only a manufacturing method by equipment that is not capable of actual large-scale industrial production, for example, using cross rolling or vacuum annealing, is known.

In particular, a cross rolling method may not be used in the case of being incapable of continuous production of a material, and in the case of a large generator, a cylindrical core having a diameter of several meters should be produced, and thus, the method may not be applied to a process of making a shape by dividing a core into several to tens on a plate surface and assembling them, and the productivity is extremely low.

In the case of the generator, since a general turbine generator produces electricity according to a commercial electrical frequency of 50 Hz or 60 Hz of each country, magnetic properties at 50 Hz and 60 Hz are important, but in a generator having a low rotation speed such as a wind generator, magnetic properties at DC and 30 Hz or less as such are important.

Therefore, in the above equipment, magnetic flux density properties showing a magnetization degree is more important than iron loss occurring in AC magnetism, and generally, this is evaluated by B8 magnetic flux density. The B8 magnetic flux density refers to a magnetic flux density value of a steel sheet at a magnetic field strength of 800 Nm, and this is measured at an alternating current of 50 Hz, but in some cases, may be measured at direct current of at a frequency of 50 Hz or less.

DISCLOSURE

Technical Problem

The present invention has been made in an effort to provide a double-oriented electrical steel sheet and a method for producing the same. Specifically, in an exemplary embodiment of the present invention, a double-oriented electrical steel sheet having excellent magnetism in a rolling direction and a rolling vertical direction, by appropriately controlling the contents of Ti, Mg, and Ca in an alloy composition and adjusting rolling conditions to increase a fraction of crystal grains having a {100}<001> orientation, and a method for producing the same are provided.

Technical Solution

An exemplary embodiment of the present invention provides a double-oriented electrical steel sheet including, by weight: 2.0 to 4.0% of Si, 0.01 to 0.04% of Al, 0.0004 to 0.02% of S, 0.05 to 0.3% of Mn, 0.01% or less (exclusive of 0%) of N, 0.005% or less (exclusive of 0%) of C, 0.005 to 0.15% of P, 0.001 to 0.005% of Ti, 0.0001 to 0.005% of Ca, and 0.0001 to 0.005% of Mg, with a balance of Fe and other inevitable impurities, wherein an area fraction of crystal grains having an orientation within 15° or less from {100}<001> is 60 to 99%, and an area fraction of crystal grains having an orientation within 15° or less from {100}<025> is within 1 to 30%.

The double-oriented electrical steel sheet according to an exemplary embodiment of the present invention may satisfy the following Equation 1:

$$10\times([Ti]+[Ca]+[Mg])\geq[Al] \quad \text{[Equation 1]}$$

wherein [Ti], [Ca], [Mg], and [Al] represent contents (wt %) of Ti, Ca, Mg, and Al, respectively.

The double-oriented electrical steel sheet according to an exemplary embodiment of the present invention may further include one or more of 0.1 wt % or less of Sn, 0.001 to 0.1 wt % of Sb, and 0.01 to 0.2 wt % of Mo.

The double-oriented electrical steel sheet according to an exemplary embodiment of the present invention may further include one or more of 0.01 wt % or less of Bi, 0.01 wt % or less of Pb, 0.01 wt % or less of As, 0.01 wt % or less of Be, and 0.01 wt % or less of Sr.

The double-oriented electrical steel sheet according to an exemplary embodiment of the present invention may have an average crystal grain diameter of 20 times or more a thickness of the steel sheet.

The double-oriented electrical steel sheet according to an exemplary embodiment of the present invention may include an oxide layer formed in a direction from a surface of a substrate to an interior of the substrate of the steel sheet and an insulating layer formed on the surface of the substrate.

The surface of the substrate and the insulating layer may be in contact with each other.

A forsterite layer interposed between the surface of the substrate and the insulating layer may be further included.

The double-oriented electrical steel sheet according to an exemplary embodiment of the present invention may have Br both in a rolling direction and in a rolling vertical direction of 1.65 T or more, and Br in a circumferential direction of 1.58 T or more. Br is calculated by the following Equation 2:

$$Br=7.87/(7.87-0.065\times[Si]-0.1105\times[Al])\times B8 \quad \text{[Equation 2]}$$

wherein [Si] and [Al] represent contents (wt %) of Si and Al, respectively, and

B8 represents strength (Tesla) of a magnetic field derived when maintained at 800 A/m.

Another embodiment of the present invention provides a method for producing a double-oriented electrical steel sheet, including: producing a slab including, by weight: 2.0 to 4.0% of Si, 0.01 to 0.04% of Al, 0.0004 to 0.02% of S, 0.05 to 0.3% of Mn, 0.02% or less (exclusive of 0%) of N, 0.05% or less (exclusive of 0%) of C, 0.005 to 0.15% of P, 0.001 to 0.005% of Ti, 0.0001 to 0.005% of Ca, and 0.0001 to 0.005% of Mg, with a balance of Fe and other inevitable impurities; hot rolling the slab to produce a hot rolled plate; rolling the hot rolled plate to produce a steel sheet; subjecting the steel sheet to primary recrystallization annealing; and subjecting the steel sheet subjected to the primary recrystallization annealing to secondary recrystallization annealing, wherein a total reduction rate in the producing of a hot rolled plate is 95% or more, the producing of a hot rolled plate includes a plurality of passes, and a reduction rate in each pass is 50% or less.

The slab may satisfy the following Equation 3:

$$[C]/[Si]\geq 0.0067 \quad \text{[Equation 3]}$$

wherein [C] and [Si] represent contents (wt %) of C and Si in the slab, respectively.

The step of producing the hot rolled plate may be performed at a temperature of 700° C. or higher.

The step of producing a steel sheet may include primary rolling the hot rolled plate; performing intermediate annealing; and secondary rolling the intermediate annealed steel sheet.

The primary rolling step and the secondary rolling step may have a reduction rate of 75% or less, respectively.

The primary rolling step and the secondary rolling step may include a plurality of passes and a reduction rate in each pass of 45% or less.

The primary rolling step and the secondary rolling step may be performed at a temperature of 50° C. or higher and lower than 700° C.

The primary recrystallization annealing step may include decarburizing at a dew point temperature of 50 to 70° C.

The primary recrystallization annealing step may include nitrifying and have a nitrified amount of 0.01 to 0.03 wt %.

After the primary recrystallization annealing step, the steel sheet subjected to the primary recrystallization annealing may have an average crystal grain diameter of 30 to 50 μm.

After the primary recrystallization annealing step, applying an annealing separating agent may be further included.

After the secondary recrystallization annealing step, removing a forsterite layer formed on a surface of a steel sheet may be further included.

Advantageous Effects

The double-oriented electrical steel sheet according to an embodiment of the present invention has excellent magnetism in a rolling direction and a rolling vertical direction, by appropriately controlling contents of Ti, Mg, and Ca in an alloy composition and adjusting rolling conditions.

In particular, the double-oriented electrical steel sheet may be useful for a generator having a slow rotation speed such as a wind generator.

MODE FOR INVENTION

Figure 1:
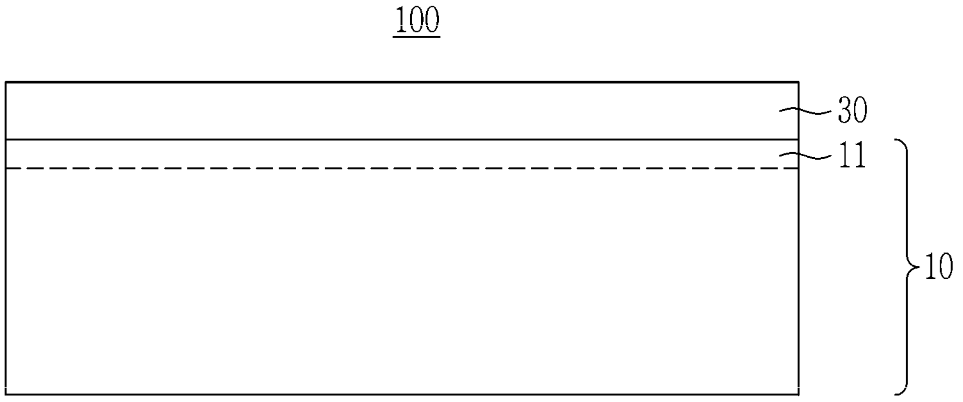
FIG. 1 is a schematic view of a cross-section of the double-oriented electrical steel sheet according to an exemplary embodiment of the present invention.

The terms such as first, second, and third are used for describing various parts, components, areas, layers, and/or sections, but are not limited thereto. These terms are used only for distinguishing one part, component, area, layer, or section from other parts, components, areas, layers, or sections. Therefore, a first part, component, area, layer, or section described below may be mentioned as a second part, component, area, layer, or section without departing from the scope of the present invention.

The terminology used herein is only for mentioning a certain example, and is not intended to limit the present invention. Singular forms used herein also include plural forms unless otherwise stated clearly to the contrary. The meaning of “comprising” used in the specification is embodying certain characteristics, regions, integers, steps, operations, and/or components, but is not excluding the presence or addition of other characteristics, regions, integers, steps, operations, and/or components.

When it is mentioned that a part is present “on” the other part, the part may be present directly on the other part, or another part may be involved between them. In contrast, when it is mentioned that a part is present “directly on” the other part, there is no part interposed between them.

Though not defined otherwise, all terms including technical terms and scientific terms used herein have the same meaning as commonly understood by a person with ordinary skill in the art to which the present invention pertain. Terms defined in commonly used dictionaries are further interpreted as having a meaning consistent with the related technical literatures and the currently disclosed description, and unless otherwise defined, they are not interpreted as having an ideal or very formal meaning.

In addition, unless otherwise particularly stated, % means wt %, and 1 ppm is 0.0001 wt %.

The meaning of further including an additional element in an exemplary embodiment of the present invention is including an additional element in place of iron (Fe) as a balance at the added amount of the additional element.

Hereinafter, an exemplary embodiment of the present invention will be described in detail so that a person with ordinary skill in the art to which the present invention pertains may easily practice the invention. As those skilled in the art would realize, the described embodiments may be modified in various different ways, all without departing from the spirit or scope of the present invention.

The double-oriented electrical steel sheet according to an exemplary embodiment of the present invention includes, by weight: 2.0 to 4.0% of Si, 0.01 to 0.04% of Al, 0.0004 to 0.02% of S, 0.05 to 0.3% of Mn, 0.01% or less (exclusive of 0%) of N, 0.005% or less (exclusive of 0%) of C, 0.005 to 0.15% of P, 0.001 to 0.005% of Ti, 0.0001 to 0.005% of Ca, and 0.0001 to 0.005% of Mg, with a balance of Fe and other inevitable impurities.

First, the reasons for limiting components of the double-oriented electrical steel sheet will be described.

Si: 2.00 to 4.00 wt %

Silicon (Si) is an element which forms austenite in hot rolling, and it is necessary to limit the amount added for having an austenite fraction of about 10% in the vicinity of the slab heating temperature and in the vicinity of a hot rolled plate annealing temperature. In addition, in secondary recrystallization annealing, only when ferrite is a single phase, a secondary recrystallization microstructure may be formed well, and thus, it is necessary to limit silicon to a component which becomes a ferrite single phase. In pure iron, when 2.0 wt % or more of silicon is added, a ferrite single phase is formed, an austenite fraction may be adjusted by adding C thereto, and thus, the lower limit of a Si content may be defined as 2.0 wt %. In addition, at more than 4 wt %, cold rolling is difficult and saturation magnetic flux drops, and thus, the content is limited. More specifically, Si may be included at 2.2 to 3.3 wt %. More specifically, in order to obtain a steel sheet having a high magnetic flux density, Si may be included at 2.4 to 2.9 wt %.

Al: 0.010 to 0.040 wt %

Aluminum (Al) forms AlN, which is used as an inhibitor of secondary recrystallization. In an exemplary embodiment of the present invention, a cube texture may be obtained when an inhibitor is used other than a common nitrification process of directional electrical steel sheet, and thus, an amount of Al added may be controlled in a broader range than a common directional electrical steel sheet. However, when aluminum is added at less than 0.01 wt %, oxides in steel is greatly increased to deteriorate magnetism, and a secondary recrystallization temperature is changed to interfere with formation of cube orientation, and thus, the lower limit is 0.01 wt %. When the upper limit is more than 0.04 wt %, a secondary recrystallization temperature is greatly raised to make industrial production difficult. More specifically, Al may be included at 0.015 to 0.035 wt %.

S: 0.0004 to 0.0200 wt %

Sulfur (S) is bonded to Cu or Mn in steel to form fine MnS, the finely formed precipitates assist secondary recrystallization, and thus, the amount added may be 0.0004 to 0.02 wt %. When S is added in excess, a Goss fraction in steel during secondary recrystallization may be increased by segregation of S, and precipitates on a hot rolled plate is not controlled, so that a desired texture may not be obtained in the secondary recrystallization. More specifically, S may be included at 0.0005 to 0.006 wt %.

Mn: 0.05 to 0.30 wt %

Manganese (Mn) is inevitably present in molten steel, but when added in a small amount, it may be used as precipitates, and may be added to steel as an element which changes to MnS after forming FeS. However, when added too much, the bond between Mn and S remains strong even during high temperature annealing, and thus, the bond of Mg, Ca, and S forming fine precipitates is interrupted. On the contrary, when included too little, it may be difficult to control texture during secondary recrystallization. Therefore, Mn may be included at 0.05 to 0.3 wt %. More specifically, Mn may be included at 0.08 to 0.2 wt %.

N: 0.0100 wt % or Less

Nitrogen (N) is an element which forms AlN, which is used as an inhibitor, and thus, it is necessary to secure an appropriate content. When N is included too little, a structural non-uniformity deformation degree is sufficiently increased in cold rolling, and thus, cube growth is promoted in first recrystallization and Goss growth may not be suppressed. When N is included in excess, surface defects such as blister by nitrogen diffusion are caused in a process after hot rolling, and also, excessive nitrides are formed in a hot rolled steel sheet state so that rolling is not easy, resulting in a rise in manufacturing costs.

N may be included at 0.02 wt % or less in the slab. In an exemplary embodiment of the present invention, in primary recrystallization annealing, a nitrification process is included, but when 0.01 wt % to 0.02 wt % of N is added to a hot rolled steel sheet, a sufficient inhibitor may be prepared even when omitting the nitrification process. Since a part of N is removed in secondary recrystallization annealing, N contents in the slab and in the finally produced electrical steel sheet may be different.

C: 0.0050 wt % or Less

When Carbon (C) is included in a large amount even after secondary recrystallization annealing, it causes magnetic aging to greatly increase iron loss, and thus, the upper limit is 0.005 wt %. More specifically, C may be included at 0.0001 to 0.005 wt %.

C may be included at 0.05 wt % or less in the slab. Thus, stress concentration and Goss formation in a hot rolled plate may be suppressed, and precipitates may be refined. In addition, C may increase a structural non-uniformity deformation degree during cold rolling to promote cube growth in primary recrystallization and suppress Goss growth. However, when C is added in excess, stress concentration in a hot rolled plate may be relieved, but Goss formation may not be suppressed and precipitate refining is difficult. Since cold rollability is greatly deteriorated even in cold rolling, the amount added has a limitation. In the primary recrystallization annealing in an exemplary embodiment of the present invention, a decarburizing process is included, and thus, C contents in the slab and in the finally produced electrical steel sheet may be different.

C and Si contents in the slab may satisfy Equation 3:

$$[C]/[Si] \geq 0.0067 \quad \text{[Equation 3]}$$

wherein [C] and [Si] represent contents (wt %) of C and Si in the slab, respectively.

When C is included too little, or Si is included too much, it may become difficult to promote cube growth and suppress Goss growth. More specifically, the left side of Equation 3 may be 0.0083 or more.

P: 0.005 to 0.150 wt %

Since phosphorus (P) serves to improve resistivity of a steel and improve a cube fraction in secondary recrystallization, and increases a non-uniform deformation amount in cold rolling, it is preferred to add at least 0.005 wt % or more of phosphorus. However, when more than 0.15 wt % of phosphorus is added, cold rollability is extremely poor, and thus, the amount added is limited. More specifically, P may be included at 0.01 to 0.08 wt %.

Ca: 0.0001 to 0.0050 wt % and Mg: 0.0001 to 0.0050 wt %

Both calcium (Ca) and magnesium (Mg) are alloy elements having excellent reactivity in a steel, and have a great influence on the steel even with a small amount added. In a steel having an appropriate amount of S added, Ca and Mg are bonded to S to form a fine sulfide at a high temperature. Since this is stable even at a low temperature, when fine precipitates as such are formed on a hot rolled plate, it serves as an inhibitor for controlling texture in secondary recrystallization. However, when Ca and Mg are added in excess, they are bonded to oxygen in the steel to form an oxide, and this oxide may cause surface defects and poor magnetism. Therefore, 0.0001 to 0.005 wt % of Ca and 0.0001 to 0.005 wt % of Mg are included. More specifically, 0.001 to 0.003 wt % of Ca and 0.0005 to 0.0025 wt % of Mg are included.

Ti: 0.0010 to 0.0050 wt %

Titanium (Ti) is an alloy element having excellent reactivity in a steel, and reacts with C, N, O, and the like in a steel to rapidly form inclusion and precipitates from soft casting. By the addition of Ti, solid-solubilized oxygen in the steel is first removed, and then the solid solubilization degree of C, N, and the like is decreased. For cube growth, the solid solubilized oxygen amount in the steel is required to be controlled, and thus, it is preferred that the amount added thereof is 0.001 wt % or more. However, it is preferred that 0.005 wt % or less of Ti is added, in order not to serve to decrease the solid solubilization degree of C and N which affects deformation during rolling in the steel. More specifically, Ti may be included at 0.002 to 0.004 wt %.

The double-oriented electrical steel sheet according to an exemplary embodiment of the present invention may satisfy the following Equation 1:

$$10\times([Ti]+[Ca]+[Mg])\geq[Al] \quad \text{[Equation 1]}$$

wherein [Ti], [Ca], [Mg], and [Al] represent contents (wt %) of Ti, Ca, Mg, and Al, respectively.

Ca and Mg may be bonded to S and play a role in secondary recrystallization as an inhibitor when becoming a fine sulfide. In addition, Ti is also bonded to many impurities such as O or C, N, and S in the steel very easily to serve as an inhibitor. For the role of the inhibitor as such, a sufficient amount should be positioned with a small deviation in the distribution, with an appropriate size. Another inhibitor Al is mainly bonded to nitrogen to form AlN to suppress recrystallization growth. AlN allows secondary recrystallization to occur well, but in order to perform second recrystallization in cube orientation, not Goss orientation, it is necessary to lower a crystal growth rate by decomposition of the inhibitor. Since abnormal crystal grain growth in the secondary recrystallization is explosive crystal grain growth, it is very difficult to suppress it, and the use of an inhibitor other than AlN is much needed. Therefore, the amount of the inhibitor by Ti, Ca, and Mg needs to be sufficiently present in the steel so that Equation 1 described above is satisfied. More specifically, it is preferred that 5 times the sum of the amounts of Ca, Mg, and Ti is the amount or more than the amount of Al in the steel. That is, $5\times([Ti]+[Ca]+[Mg])\geq[Al]$ is preferred.

The double-oriented electrical steel sheet according to an exemplary embodiment of the present invention may further include one or more of 0.1 wt % or less of Sn, 0.001 to 0.1 wt % of Sb, and 0.01 to 0.2 wt % of Mo.

Sn: 0.10 wt % or Less

Tin (Sn) serves to lower the stability of Goss orientation during rolling to decrease a Goss fraction after rolling and increase a cube orientation fraction. In addition, in recrystallization, Sn serves to increase Goss. Therefore, in order to remove Goss orientation at an appropriate reduction rate and lower the Goss fraction after recrystallization, the amount of Sn added needs to be 0.1 wt % or less.

Sn has an effect of lowering a recrystallization rate and suppressing crystal growth in recrystallization, and is effective for matching the growth rate of crystal grain boundaries which rapidly grow in the crystal grain boundary to the growth rate of crystal grains which are recrystallized in the crystal grains and grow, and thus, the amount added thereof may be adjusted. More specifically, Sn may be included at 0.001 to 0.1 wt %. More specifically, Sn may be included at 0.01 to 0.05 wt %.

Sb: 0.0010 to 0.1000 wt %, Mo: 0.0100 to 0.2000 wt %

Antimony (Sb) is an element which may be added for controlling a primary recrystallization texture. In addition, when antimony is added at 0.001 wt % or more, the thickness of an oxide layer formed is changed to decrease a magnetism difference between a rolling vertical direction and a rolling direction, but when antimony is added at more than 0.1 wt %, slip in a roll in cold rolling is greatly increased, and thus, the amount is limited. More specifically, 0.005 to 0.05 wt % of Sb is appropriate. Mo is an element which assists phase stability at high temperature of carbides and nitrides in the steel when added, and may raise a secondary recrystallization temperature and assist in making precipitates finer in soft casting and hot rolled plate annealing. Therefore, the amount added thereof is defined as 0.01 to 0.2 wt %. More specifically, Mo may be included at 0.02 to 0.05 wt %.

As described above, when an additional element is included, it replaces Fe as a balance. For example, the composition of the double-oriented electrical steel sheet which further includes 0.001 to 0.1 wt % of Sb includes, by weight: 2.0 to 4.0% of Si, 0.01 to 0.04% of Al, 0.0004 to 0.002% of S, 0.05 to 0.3% of Mn, 0.005% or less (exclusive of 0%) of N, 0.005% or less (exclusive of 0%) of C, 0.005 to 0.15% of P, 0.0001 to 0.005% of Ca, 0.0001 to 0.005% of Mg, and 0.001 to 0.1% of Sb with a balance of Fe and other inevitable impurities.

The double-oriented electrical steel sheet according to an exemplary embodiment of the present invention may further include one or more of 0.0100 wt % or less of Bi, 0.0100 wt % or less of Pb, 0.0100 wt % or less of As, 0.0100 wt % or less of Be, and 0.0100 wt % or less of Sr.

Bismuth (Bi), lead (Pb), arsenic (As), beryllium (Be), and strontium (Sr) are elements of which oxides, nitrides, and carbides are finely formed, assist secondary recrystallization, and may be further added. However, when they are added at more than 0.01 wt %, formation of secondary recrystallization becomes instable, and thus, it is necessary to limit the amount added thereof.

In addition, the double-oriented electrical steel sheet of the present invention includes Fe and inevitable impurities as a balance other than the components described above.

However, within the range which does not impair the operational effect of the present invention, inclusion of other elements is not excluded.

As such, the double-oriented electrical steel sheet according to an exemplary embodiment of the present invention precisely controls an alloy composition to form many cube textures. Specifically, an area fraction of crystal grains having orientation of 15° or less from {100}<001> may be 60 to 99%. Here, more than 99% means that formation of island grains which are inevitably formed during secondary recrystallization is suppressed, and also precipitates are completely removed, and for this, an annealing time at a high temperature is greatly increased, and thus, the area fraction is defined as 60 to 99%. More specifically, the area fraction may be 70 to 97%. More specifically, the area fraction may be 80 to 95%.

In addition, crystal grains having {100}<025> orientation has orientation rotated about 22.5° from {100}<001>, and as the orientation increases, the steel sheet has decreased double-oriented characteristics and uniform circumferential characteristics, and thus, for securing double-oriented characteristics, the area fraction of the crystal grains having the orientation should be within 30%. Meanwhile, since the orientation less adversely affects the magnetism since a {100} surface is parallel to the steel sheet surface, and is rotated at 22.5° from {100}<001>, some crystal grains having orientation of 15° or less from {100}<001> may be regarded as crystal grains at 15° or less of {100}<025>, and thus, the area fraction may not be 0%. Assuming a Gaussian distribution of 15°, a minimum value of 1% or more may be included. More specifically, the area fraction may be 3 to 20%. More specifically, the area fraction may be 5 to 15%. Crystal grains which are not {100}<001> and {100}<025> may be included at 10% or less.

The double-oriented electrical steel sheet according to an exemplary embodiment of the present invention may have an average crystal grain diameter of 20 times the thickness of the steel sheet. In an exemplary embodiment of the present invention, secondary recrystallization is used, and a crystal grain diameter of secondary recrystallization of more than 20 times the thickness of the sheet is advantageous for obtaining desired orientation. A crystal grain diameter may be measured based on a surface parallel to a rolled surface (ND surface) of the steel sheet. A particle diameter refers to a diameter of a circle, when an imaginary circle having the same area as a crystal grain is assumed.

FIG. 1 is a schematic view of a cross-section of the double-oriented electrical steel sheet 100 according to an exemplary embodiment of the present invention.

As shown in FIG. 1, an oxide layer 11 formed in a direction from a surface of a substrate 10 to an interior of the substrate 10 of the steel sheet and an insulating layer 30 formed on the surface of the steel sheet may be included. Here, the surface of the substrate 10 of the steel sheet refers to one surface or both surfaces (upper surface and lower surface) of the steel sheet.

The oxide layer 11 is formed by penetrating oxygen into the substrate. Specifically, 10 wt % or more of oxygen (O) may be included, in addition to the composition of the steel sheet described above. In terms of an oxygen content, the substrate 10 and the oxide layer 11 may be distinguished. The oxide layer 11 may be present at a thickness of 5 μm or less. When the oxide layer 11 is too thick, cube grain growth is suppressed by an oxygen fraction in the steel, and thus, a cube fraction is lowered, and eventually, magnetism is deteriorated. More specifically, the oxide layer 11 may have a thickness of 0.01 to 2.5 μm.

On the surface of the substrate 10, an insulating layer 30 may be formed. The insulating layer 30 assists in securing insulation.

The insulating layer 30 may be formed from an organic or inorganic coating composition, and in some cases, may be formed from an organic/inorganic composite coating composition. The insulating layer 30 may have a thickness of 0.2 to 8 μm.

When the thickness is too small, it is difficult to meet the required insulating characteristics. The insulating layer 30 may have a thickness of 0.2 to 8 μm. When the thickness is too large, movement of a magnetic domain becomes difficult in surface magnetization, magnetization is not easy, and thus, eventually, magnetism may be deteriorated. When the insulating layer 30 is formed on both surfaces of the substrate 10, each of the insulating layers 30 formed on both surfaces may satisfy the thickness range described above. More specifically, insulating layer 30 may have a thickness of 0.4 to 5 μm.

Figure 2:
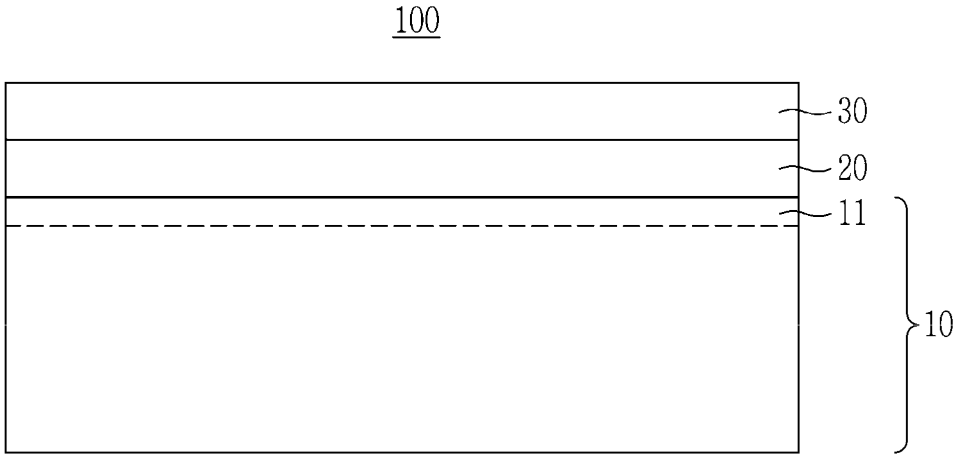
FIG. 2 is a schematic view of a cross-section of the double-oriented electrical steel sheet according to another exemplary embodiment of the present invention.

FIG. 2 is a schematic view of a cross-section of the double-oriented electrical steel sheet 100 according to another exemplary embodiment of the present invention. As shown in FIG. 2, a forsterite layer 20 interposed between the surface of the substrate 10 and the insulating layer 30 may be further included in an exemplary embodiment of the present invention. In the directional electrical steel sheet, in order to impart tension in a rolling direction, an oxide layer including forsterite ($Mg_2SiO_4$) is formed at a thickness of 2 to 3 μm from the surface, and tension is imparted using a difference in a coefficient of thermal expansion between this and a parent metal. However, in an exemplary embodiment of the present invention, tension in a rolling direction refers to compression in a rolling vertical direction, and thus, it is preferred to extremely decrease the tension. Since a thin forsterite layer 20 of 2.0 μm or less has an extremely deteriorated tension imparting effect, the thin forsterite layer 20 as such may be formed to remove tension applied to the entire sheet. The forsterite layer 20 is formed from an annealing separating agent which has been applied before secondary recrystallization annealing. The annealing separating agent includes MgO as a main component, which is as well known, and thus, the detailed description thereof will be omitted.

After the secondary recrystallization annealing, the forsterite layer 20 may be removed, and in this case, as shown in FIG. 1, insulating layer 30 may be formed to be in contact with the surface of the substrate 10.

The double-oriented electrical steel sheet according to an exemplary embodiment of the present invention has excellent magnetism in both a rolling direction and a rolling vertical direction. Specifically, Br both in a rolling direction and in a rolling vertical direction is 1.65 T or more, Br in a circumferential direction is 1.58 T or more, and Br is calculated by the following Equation 2:

$$Br=7.87/(7.87-0.065\times[Si]-0.1105\times[Al])\times B8 \qquad \text{[Equation 2]}$$

wherein [Si] and [Al] represent contents (wt %) of Si and Al, respectively, and

B8 represents strength (Tesla) of a magnetic field derived when maintained at 800 A/m.

A large generator has an annular frame diameter of several meters and the annular frame is formed by cutting the electrical steel sheet by T-shaped teeth. Here, the teeth region of the T shape may be set as a rolling vertical direction and the annular frame may be in a rolling direction, or on the contrary, the teeth region of the T shape may be set as a rolling direction and the annular frame may be in a rolling vertical direction. The design change as such is determined by a length of teeth, a length of an annular frame diameter, and a width of the annular frame. Usually, the teeth region is a region where a large magnetic flux flows when the generator is operated, and the magnetic flux escapes into the annular region. Considering energy generated at this time, it is determined whether the rolling direction and the rolling vertical direction is the teeth region or the annular region, and when a material has a very high magnetic flux density of both Br of 1.63 T or more, the energy efficiency is very high in either direction, regardless of which region the rolling direction and the rolling vertical direction are used in. In addition, when the Br magnetic flux density in a circumferential direction is 1.56 T or more which is high, an energy loss by a magnetic flux at a connection region of the teeth region of the T shape and the annular frame is greatly decreased. Thus, the efficiency of the generator is improved, or the sizes of the width of the annular frame and the teeth region are decreased, and thus, a generator having high efficiency may be produced even with a small size core.

A method for producing a double-oriented electrical steel sheet according to an exemplary embodiment of the present invention includes: producing a slab including, by weight: 2.0 to 4.0% of Si, 0.01 to 0.04% of Al, 0.0004 to 0.02% of S, 0.05 to 0.3% of Mn, 0.02% or less (exclusive of 0%) of N, 0.05% or less (exclusive of 0%) of C, 0.005 to 0.15% of P, 0.001 to 0.005% of Ti, 0.0001 to 0.005% of Ca, and 0.0001 to 0.005% of Mg, with a balance of Fe and other inevitable impurities; hot rolling the slab to produce a hot rolled plate; rolling the hot rolled plate to produce a steel sheet; subjecting the steel sheet to primary recrystallization annealing; and subjecting the steel sheet subjected to the primary recrystallization annealing to secondary recrystallization annealing.

Hereinafter, each step will be described in detail.

First, a slab is produced. The reason why the added ratio of each composition in the slab is defined is the same as the reason for defining the composition of the double-oriented electrical steel sheet described above, and thus, repeated description will be omitted. In the producing process such as hot rolling, hot rolled plate annealing, cold rolling, primary recrystallization annealing, and secondary recrystallization annealing, as described below, the slab composition other than C and N are substantially not changed, and thus, the slab composition other than C and N and the composition of the double-oriented electrical steel sheet are substantially the same.

The slab may be produced using a thin slab method or a strip casting method. The slab may have a thickness of 200 to 300 mm. The slab may be heated, if necessary.

Next, the slab is hot rolled to produce a hot rolled plate.

The total reduction rate in the step of producing the hot rolled plate is 95% or more, a plurality of passes is included in the step of producing the hot rolled plate, and the reduction rate in each pass is 50% or less.

As described above, the size distribution of a microstructure and the distribution of precipitates may be controlled only when the reduction rate is controlled, and it may be controlled so that a desired texture is obtained when recrystallization is performed after rolling in a relationship of adjacent crystal grain tubes of each crystal grain in an appropriate size distribution.

The reduction rate may be calculated by ([thickness of steel sheet before pressing]−[thickness of steel sheet after pressing])/[thickness of steel sheet before pressing]. For example, the total reduction rate in the step of producing the hot rolled plate may be calculated by ([thickness of slab]−[thickness of hot rolled plate])/[thickness of hot rolled plate].

The step of producing the hot rolled plate may include a plurality of passes and the reduction rate in each pass may be 50% or less. Here, a pass refers to rolling in one rolling mill. Specifically, the step of producing the hot rolled plate may include 3 to 12 passes. As described above, the reduction rate in all passes in the step of producing the hot rolled plate may be 50% or less.

More specifically, the total reduction rate in the step of producing the hot rolled plate may be 97.0% to 99.9%, and the reduction rate in each pass may be 30 to 50%.

The step of producing the hot rolled plate may include roughly rolling the slab, heating a roughly rolled bar, and strip milling the heated bar, and in the heating step, a temperature of 1050° C. or higher may be maintained for 10 to 300 minutes. When a maintenance time is too short, the precipitates of the slab is not appropriately disposed to form a distribution of precipitates at a required level on a hot rolled plate, and thus, a uniform microstructure for a subsequent process may not be obtained. However, when the maintenance time is too long, precipitates may be very coarsened, and C in the slab may react with oxygen and the like during reheating to decrease the amount of C.

A hot rolling end temperature may be 1050° C. or lower. When the hot rolling end temperature is high, more shear deformation is applied during hot rolling, but recrystallization and crystal growth rates are high, and thus, crystal grains having recrystallized cube orientation may be more secured. Accordingly, a cube fraction may be increased during hot rolled plate annealing.

The hot rolled plate may have a thickness of 1 to 3.5 mm. The step of producing hot rolled plate may be performed at a temperature of 700° C. or higher.

After the step of producing the hot rolled plate, annealing the hot rolled plate may be further included.

An annealing temperature in the step of annealing the hot rolled plate may be 1000 to 1200° C.

Next, the hot rolled plate is rolled to produce the steel sheet.

The step of producing the steel sheet may include primary rolling the hot rolled plate; performing intermediate annealing; and secondary rolling the intermediate annealed steel sheet.

In the primary rolling step, the hot rolled plate is cold rolled or hot rolled to be rolled to a thickness of 0.5 to 1.8 mm.

In the primary rolling step, the reduction rate may be 75% or less. In addition, the primary rolling includes a plurality of passes, and the reduction rate in each pass may be 45% or less. When the reduction rate is too high, a Goss fraction is increased after recrystallization. Specifically, the primary rolling step may include 2 to 8 passes.

More specifically, in the primary rolling step, the reduction rate may be 60 to 75%, and the reduction rate in each pass may be 35 to 45%.

The intermediate annealing step may be performed at 1000 to 1200° C.

In the secondary rolling, the primary rolled steel sheet is cold or hot rolled to be rolled to a thickness of 0.15 to 0.65 mm.

In the secondary rolling, the reduction rate may be 75% or less. In addition, the secondary rolling step includes a plurality of passes, and the reduction rate in each pass may be 45% or less. When the reduction rate is too high, a Goss fraction is increased after recrystallization. Specifically, the secondary rolling step may include 1 to 6 passes.

More specifically, in the secondary rolling, the reduction rate may be 60 to 75%, and the reduction rate in each pass may be 35 to 45%.

The primary rolling step and the secondary rolling step may be performed at a temperature of 50° C. or higher and lower than 700° C.

The primary recrystallization annealing step may include decarburizing at a dew point temperature of 50 to 70° C. When carbon is included in a large amount even after the secondary recrystallization annealing, it causes magnetic aging to greatly increase iron loss, and thus, carbon may be partly removed by decarburizing in the primary recrystallization annealing step. It may be performed at a dew point temperature of 50° C. to 70° C. under a mixed atmosphere of hydrogen and nitrogen.

In the primary recrystallization annealing step, a nitrified amount may be 0.01 to 0.03 wt %. When the nitrified amount is not appropriately secured, secondary recrystallization is not formed well, so that magnetism may be deteriorated.

Decarburization and nitrification may be performed simultaneously or sequentially. When performed sequentially, nitrification after decarburization or decarburization after nitrification may be performed.

After the primary recrystallization annealing, the primary recrystallization annealed steel sheet may have an average crystal grain diameter of 30 to 50 μm. When the average crystal grain diameter of the steel sheet subjected to the primary recrystallization annealing is not appropriately secured, secondary recrystallization is not formed well, and magnetism may be deteriorated.

The primary recrystallization annealing may be performed in a temperature range of 800 to 900° C.

After the primary recrystallization annealing step, applying an annealing separating agent including MgO may be further included.

The forsterite layer formed by applying the annealing separating agent is as described above, and thus, overlapping description will be omitted.

In the secondary recrystallization annealing, heating is performed at an appropriate heating rate to cause secondary recrystallization in {100}<001> cube orientation, and then purification annealing which is an impurity removal process is performed and cooling is performed. In the process, annealing atmospheric gas is heat-treated using mixed gas of hydrogen and nitrogen in a heating process, like common cases, and impurities are removed by maintaining for a long time using 100% hydrogen gas in purification annealing. The temperature of the secondary recrystallization annealing may be 1000 to 1300° C., and the time may be 10 to 25 hours.

in an exemplary embodiment of the present invention, the forsterite layer may be preferably thin or removed, as described above. Therefore, removing a forsterite layer formed on the surface of the steel sheet may be further included after the secondary recrystallization annealing. The removal method may use a physical or chemical method.

The following examples illustrate the present invention in more detail. However, the following examples are only a specific exemplary embodiment of the present invention, and the present invention is not limited to the following examples.

Experimental Example 1

A slab including components with a balance of Fe and inevitable impurities shown in Tables 1 and 2 was produced, heated at 1200° C., and hot rolled in 8 passes to produce a hot rolled coil having a thickness of 2.3 mm. A hot rolled plate was annealed at 1050° C. to 1140° C. for 30 seconds, annealed at 930° C. for 90 seconds, and a quenched hot rolled annealed plate was primary rolled to a thickness of 1.3 mm in 3 passes at 200° C. The reduction rate at this time was 40%. This was annealed again at 1050° C. to 1140° C. for 30 seconds and annealed at 930° C. for 90 seconds, and the quenched annealed plate was secondary rolled to the thickness indicated in Table 4 in 4 passes at 200° C.

The rolled plate was subjected to primary recrystallization annealing in which the plate was nitrified at mass indicated as wt % in Table 3, and simultaneously, was decarburized by setting an atmosphere shown in Table 3 to an atmosphere of 75 vol % of hydrogen as the dew point. Thereafter, a crystal grain diameter was measured and is shown in Table 3. Thereafter, an annealing separating agent including a MgO component was applied or not applied, heating to 1200° C. was performed at a heating rate of 20° C./hr, and then secondary recrystallization annealing was performed for 20 hours. The MGO annealing separating agent was removed from the cooled plate, and then magnetism was measured with or without removal of the forsterite layer and is summarized in Table 3. In Table 3, the reduction rate hot rolling (rolling at 700° C. or higher) and primary/secondary cold/hot rolling (rolling at lower than 700° C.) and the reduction rate in a pass at a maximum reduction are summarized. The reduction rate in primary/secondary cold/hot rolling (rolling at lower than 700° C.) shows a high reduction rate in each of the primary rolling and the secondary rolling which were divided based on intermediate annealing.

Cube fractions (area fractions of crystal grains having a {100}<001> orientation) and Br values were measured and are summarized in Table 4.

TABLE 1

| Name of specimen | Remarks | Si | Al | S | Mn | N | C-slab | C-sheet | P | Ti | Ca | Mg |
|---|---|---|---|---|---|---|---|---|---|---|---|---|
| DR 1 | Comparative example | 2.9 | 0.022 | 0.0031 | 0.26 | 0.006 | 0.041 | 0.0028 | 0.017 | 0.0036 | 0.002 | 0.001 |
| DR 2 | Comparative example | 2.51 | 0.021 | 0.0043 | 0.26 | 0.0066 | 0.03 | 0.0009 | 0.074 | 0.0042 | 0.001 | 0.0011 |
| DR 3 | Inventive example | 3.07 | 0.035 | 0.0048 | 0.06 | 0.0077 | 0.021 | 0.0043 | 0.086 | 0.0042 | 0.0032 | 0.0008 |

TABLE 1-continued

| Name of specimen | Remarks | Si | Al | S | Mn | N | C-slab | C-sheet | P | Ti | Ca | Mg |
|---|---|---|---|---|---|---|---|---|---|---|---|---|
| DR 4 | Inventive example | 2.96 | 0.035 | 0.0063 | 0.12 | 0.0025 | 0.025 | 0.0002 | 0.039 | 0.003 | 0.002 | 0.0004 |
| DR 5 | Comparative example | 2.74 | 0.065 | 0.0031 | 0.12 | 0.0109 | 0.038 | 0.0009 | 0.102 | 0.0033 | 0.0006 | 0.0002 |
| DR 6 | Inventive example | 3.02 | 0.025 | 0.0045 | 0.08 | 0.003 | 0.023 | 0.0023 | 0.089 | 0.0033 | 0.0021 | 0.0008 |
| DR 7 | Comparative example | 3.16 | 0.095 | 0.0031 | 0.1 | 0.0071 | 0.03 | 0.0001 | 0.0813 | 0.0042 | 0.0026 | 0.0024 |
| DR 8 | Inventive example | 2.86 | 0.04 | 0.0062 | 0.1 | 0.0079 | 0.03 | <0.0001 | 0.086 | 0.0021 | 0.0022 | 0.0002 |
| DR 9 | Comparative example | 2.78 | 0.02 | 0.0041 | 0.48 | 0.0071 | 0.033 | 0.003 | 0.082 | 0.0024 | 0.0012 | 0.0004 |
| DR 10 | Inventive example | 3.07 | 0.035 | 0.0048 | 0.11 | 0.0077 | 0.024 | 0.0043 | 0.086 | 0.0042 | 0.0032 | 0.0008 |
| DR 11 | Comparative example | 2.84 | 0.023 | 0.0083 | 0.17 | 0.0065 | 0.043 | 0.006 | 0.015 | 0.002 | 0.003 | 0.0004 |
| DR 12 | Comparative example | 3.1 | 0.012 | 0.0091 | 0.15 | 0.0041 | 0.026 | 0.0042 | 0.053 | 0.0044 | 0.0044 | 0.0065 |
| DR 13 | Comparative example | 2.69 | 0.027 | 0.0005 | 0.06 | 0.0019 | 0.032 | 0.0016 | 0.077 | 0.0032 | 0.002 | 0.0002 |
| DR 14 | Inventive example | 3.08 | 0.013 | 0.0013 | 0.21 | 0.0031 | 0.03 | 0.0001 | 0.011 | 0.002 | 0.0005 | 0.0007 |
| DR 15 | Comparative example | 2.8 | 0.016 | 0.0014 | 0.15 | 0.006 | 0.05 | 0.0016 | 0.096 | 0.001 | 0.003 | 0.0008 |
| DR 16 | Comparative example | 2.92 | 0.023 | 0.0005 | 0.08 | 0.012 | 0.034 | 0.0032 | 0.041 | 0.001 | 0.0047 | 0.0006 |
| DR 17 | Comparative example | 2.94 | 0.015 | 0.0006 | 0.18 | 0.0089 | 0.021 | 0.0028 | 0.049 | 0.0013 | 0.0007 | 0.0007 |
| DR 18 | Comparative example | 3.16 | 0.62 | 0.0031 | 0.07 | 0.0026 | 0.023 | 0.0016 | 0.0306 | 0.0024 | 0.0012 | 0.0009 |
| DR 19 | Comparative example | 2.38 | 0.023 | 0.0066 | 0.06 | 0.0081 | 0.026 | 0.0004 | 0.032 | 0.0037 | 0.0011 | 0.0011 |
| DR 20 | Comparative example | 2.8 | 0.024 | 0.0021 | 0.15 | 0.003 | 0.02 | 0.0002 | 0.03 | 0.0053 | 0.001 | 0.0001 |
| DR 21 | Inventive example | 3.08 | 0.013 | 0.0013 | 0.1 | 0.0031 | 0.025 | 0.0001 | 0.011 | 0.002 | 0.0005 | 0.0007 |
| DR 22 | Comparative example | 2.6 | 0.036 | 0.0087 | 0.24 | 0.0014 | 0.025 | 0.0004 | 0.024 | 0.0034 | 0.001 | 0.0001 |
| DR 23 | Comparative example | 3.16 | 0.012 | 0.0016 | 0.28 | 0.0061 | 0.024 | 0.0008 | 0.066 | 0.001 | 0.0009 | 0.0006 |
| DR 24 | Inventive example | 3.19 | 0.017 | 0.0038 | 0.16 | 0.0045 | 0.031 | 0.0016 | 0.037 | 0.0046 | 0.002 | 0.0004 |
| DR 25 | Comparative example | 3.03 | 0.031 | 0.002 | 0.06 | 0.0005 | 0.021 | 0.0001 | 0.07 | 0.0019 | 0.0001 | 0.002 |
| DR 26 | Comparative example | 2.44 | 0.021 | 0.0036 | 0.11 | 0.0072 | 0.035 | 0.0017 | 0.052 | 0.0038 | 0.001 | 0.0009 |
| DR 27 | Comparative example | 3.21 | 1.2 | 0.0031 | 0.17 | 0.0046 | 0.031 | 0.0023 | 0.1 | 0.0046 | 0.001 | 0.0001 |

TABLE 1-continued

| Name of specimen | Remarks | Si | Al | S | Mn | N | C-slab | C-sheet | P | Ti | Ca | Mg |
|---|---|---|---|---|---|---|---|---|---|---|---|---|
| DR 28 | Comparative example | 2.91 | 0.026 | 0.0015 | 0.21 | 0.0096 | 0.006 | 0.0003 | 0.046 | 0.0048 | 0.0027 | 0.0001 |
| DR 29 | Comparative example | 2.35 | 0.012 | 0.0015 | 0.14 | 0.0064 | 0.026 | 0.0016 | 0.002 | 0.001 | 0.0048 | 0.0001 |
| DR 30 | Comparative example | 2.56 | 0.047 | 0.0042 | 0.15 | 0.0026 | 0.02 | 0.0027 | 0.034 | 0.0025 | 0.0014 | 0.0004 |
| DR 31 | Comparative example | 2.86 | 0.026 | 0.0084 | 0.45 | 0.0005 | 0.03 | <0.0001 | 0.094 | 0.0042 | 0.001 | 0.0002 |
| DR 32 | Inventive example | 2.87 | 0.031 | 0.0028 | 0.13 | 0.0081 | 0.031 | 0.001 | 0.081 | 0.0032 | 0.002 | 0.001 |
| DR 33 | Inventive example | 2.68 | 0.035 | 0.0035 | 0.12 | 0.0095 | 0.038 | 0.003 | 0.083 | 0.0033 | 0.0009 | 0.0002 |
| DR 34 | Comparative example | 2.41 | 0.023 | 0.0038 | 0.16 | 0.006 | 0.031 | 0.0036 | 0.09 | 0.0041 | 0.0013 | 0.0003 |
| DR 35 | Comparative example | 2.51 | 0.028 | 0.002 | 0.15 | 0.0112 | 0.04 | 0.003 | 0.088 | 0.001 | 0.001 | 0.0002 |
| DR 36 | Comparative example | 2.75 | 0.036 | 0.0002 | 0.28 | 0.0036 | 0.034 | 0.0021 | 0.006 | 0.0038 | 0.0036 | 0.0005 |
| DR 37 | Comparative example | 3.31 | 0.043 | 0.0031 | 0.21 | 0.0018 | 0.03 | 0.0018 | 0.0067 | 0.0007 | 0.0022 | 0.0003 |
| DR 38 | Comparative example | 3.05 | 0.502 | 0.0031 | 0.11 | 0.006 | 0.031 | 0.0013 | 0.0116 | 0.0022 | 0.0011 | 0.003 |
| DR 39 | Inventive example | 2.68 | 0.035 | 0.0035 | 0.12 | 0.0095 | 0.038 | 0.002 | 0.083 | 0.0033 | 0.0009 | 0.0002 |
| DR 40 | Comparative example | 3.19 | 0.03 | 0.002 | 0.1 | 0.004 | 0.027 | 0.0021 | 0.18 | 0.0048 | 0.001 | 0.0007 |
| DR 41 | Comparative example | 2.96 | 0.001 | 0.0024 | 0.11 | 0.0094 | 0.02 | 0.0011 | 0.023 | 0.0016 | 0.003 | 0.0009 |
| DR 42 | Comparative example | 3.06 | 0.011 | 0.0054 | 0.13 | 0.0028 | 0.009 | 0.0004 | 0.092 | 0.0012 | 0.0087 | 0.0011 |
| DR 43 | Comparative example | 2.84 | 0.029 | 0.0205 | 0.11 | 0.0076 | 0.04 | 0.003 | 0.07 | 0.0043 | 0.0001 | 0.0008 |
| DR 44 | Comparative example | 2.62 | 0.024 | 0.0038 | 0.07 | 0.005 | 0.021 | <0.000 | 0.057 | 0.0004 | 0.001 | 0.0008 |
| DR 45 | Comparative example | 3 | 0.035 | 0.0082 | 0.13 | 0.0039 | 0.018 | 0.0023 | 0.015 | 0.0039 | 0.001 | 0.0006 |

TABLE 2

| Name of specimen | Sn | Sb | Mo | Bi | Pb | As | Be | Sr | Equation 1 | Equation 3 |
|---|---|---|---|---|---|---|---|---|---|---|
| DR1 | 0.03 | 0.003 | 0.25 | 0.0004 | 0.0003 | 0.0076 | 0.0005 | 0.0008 | ○ | ○ |
| DR2 | 0.05 | 0.001 | 0.006 | 0.0005 | 0.0001 | 0.0048 | 0.0001 | 0.0012 | ○ | ○ |
| DR3 | 0.05 | 0.0049 | 0.015 | 0.0003 | 0.0001 | 0.0083 | 0.0008 | 0.0006 | ○ | ○ |
| DR4 | 0.02 | 0.0012 | 0.03 | 0.0004 | 0.0002 | 0.0019 | 0.0002 | 0.0003 | ○ | ○ |
| DR5 | 0.09 | 0.0046 | 0.0045 | 0.0001 | 0.0002 | 0.0065 | 0.0006 | 0.0003 | X | ○ |
| DR6 | 0.05 | 0.0047 | 0.0467 | 0.0005 | 0.0001 | 0.0028 | 0.0008 | 0.0019 | ○ | ○ |
| DR7 | 0.01 | 0.0012 | 0.0481 | 0.001 | 0.0001 | 0.0006 | <0.0001 | 0.0025 | X | ○ |
| DR8 | 0.03 | 0.0035 | 0.0412 | 0.0005 | 0.0004 | 0.0012 | 0.0006 | 0.0016 | ○ | ○ |
| DR9 | 0.01 | 0.0023 | 0.0463 | <0.0001 | 0.0006 | 0.0028 | 0.0004 | 0.0019 | ○ | ○ |
| DR10 | 0.05 | 0.0049 | 0.015 | 0.0003 | 0.0001 | 0.0083 | 0.0008 | 0.0006 | ○ | ○ |
| DR11 | 0.08 | 0.0039 | 0.0263 | 0.0001 | 0.0005 | 0.0056 | 0.0006 | 0.0011 | ○ | ○ |
| DR12 | 0.01 | 0.0034 | 0.0287 | 0.0003 | 0.0004 | 0.0083 | 0.0005 | 0.0011 | ○ | ○ |

TABLE 2-continued

| Name of specimen | Sn | Sb | Mo | Bi | Pb | As | Be | Sr | Equation 1 | Equation 3 |
|---|---|---|---|---|---|---|---|---|---|---|
| DR13 | 0.02 | 0.0019 | 0.0457 | 0.0002 | 0.02 | 0.0091 | 0.0003 | 0.0018 | ○ | ○ |
| DR14 | 0.07 | 0.004 | 0.0274 | 0.0002 | 0.0002 | 0.0031 | 0.0006 | 0.0011 | ○ | ○ |
| DR15 | 0.12 | 0.0033 | 0.0102 | 0.0003 | 0.0004 | 0.002 | 0.0005 | 0.0004 | ○ | ○ |
| DR16 | 0.02 | 0.001 | 0.0347 | 0.0002 | 0.0004 | 0.0084 | 0.0001 | 0.0014 | ○ | ○ |
| DR17 | 0.06 | 0.001 | 0.0228 | 0.0004 | 0.0001 | 0.012 | 0.0001 | 0.0009 | ○ | ○ |
| DR18 | 0.05 | 0.0047 | 0.0261 | 0.001 | 0.0019 | 0.0028 | 0.0013 | 0.0025 | X | ○ |
| DR19 | <0.0001 | 0.0003 | 0.023 | 0.0004 | 0.0001 | 0.0025 | 0.0002 | 0.0003 | ○ | ○ |
| DR20 | <0.0001 | 0.0014 | 0.0134 | 0.0004 | 0.0004 | 0.0084 | 0.0002 | 0.0005 | ○ | ○ |
| DR21 | 0.07 | 0.004 | 0.0274 | 0.0002 | 0.0002 | 0.003 | 0.0006 | 0.0011 | ○ | ○ |
| DR22 | 0.01 | 0.0022 | 0.0404 | 0.03 | 0.0002 | 0.0077 | 0.0004 | 0.0016 | ○ | ○ |
| DR23 | 0.04 | 0.0016 | 0.0182 | 0.0001 | 0.0003 | 0.002 | 0.02 | 0.0007 | ○ | ○ |
| DR24 | <0.0001 | 0.0022 | 0.0159 | <0.0001 | <0.0001 | 0.0072 | 0.0004 | 0.0006 | ○ | ○ |
| DR25 | 0.1 | 0.0017 | 0.0265 | 0.0004 | 0.0001 | 0.0084 | 0.0003 | 0.0011 | ○ | ○ |
| DR26 | 0.03 | 0.17 | 0.031 | 0.0003 | 0.0002 | 0.007 | 0.0001 | 0.0001 | ○ | ○ |
| DR27 | 0.01 | 0.0048 | 0.0087 | 0.0004 | 0.0005 | 0.0076 | <0.0001 | 0.0013 | X | ○ |
| DR28 | 0.03 | 0.001 | 0.04 | <0.0001 | 0.0004 | 0.0089 | 0.0002 | 0.0004 | ○ | X |
| DR29 | 0.03 | 0.0022 | 0.0176 | 0.0004 | 0.0003 | 0.0009 | 0.0004 | 0.0007 | ○ | ○ |
| DR30 | 0.01 | 0.005 | 0.0261 | 0.0006 | 0.0003 | 0.008 | 0.0008 | 0.001 | X | ○ |
| DR31 | 0.03 | 0.001 | 0.036 | 0.0001 | 0.0001 | 0.0017 | 0.0001 | 0.0014 | ○ | ○ |
| DR32 | 0.03 | 0.0016 | 0.02 | 0.0001 | 0.0004 | 0.0015 | 0.0003 | 0.0004 | ○ | ○ |
| DR33 | 0.1 | 0.0038 | 0.01 | 0.0005 | 0.0004 | 0.0064 | 0.0006 | 0.0002 | ○ | ○ |
| DR34 | 0.02 | 0.001 | 0.0382 | 0.0005 | 0.0001 | 0.003 | 0.0002 | 0.02 | ○ | ○ |
| DR35 | 0.01 | 0.0041 | 0.0481 | 0.0002 | 0.0002 | 0.0042 | 0.0007 | 0.0019 | X | ○ |
| DR36 | 0.09 | 0.0017 | 0.0384 | 0.0003 | 0.0006 | 0.0014 | 0.0003 | 0.0015 | ○ | ○ |
| DR37 | 0.06 | 0.0004 | 0.0093 | 0.0002 | 0.0004 | 0.0029 | 0.0002 | 0.0007 | ○ | ○ |
| DR38 | 0.03 | 0.0021 | 0.0428 | 0.0002 | 0.0017 | 0.0026 | 0.0002 | 0.0011 | X | ○ |
| DR39 | 0.1 | 0.0038 | 0.13 | 0.0005 | 0.0004 | 0.0064 | 0.0006 | 0.0002 | ○ | ○ |
| DR40 | 0.03 | 0.0011 | 0.026 | 0.0005 | 0.0005 | 0.0086 | 0.0002 | 0.001 | ○ | ○ |
| DR41 | 0.06 | 0.0029 | 0.0462 | 0.0002 | 0.0005 | 0.0066 | 0.0005 | 0.0018 | ○ | ○ |
| DR42 | 0.06 | 0.0031 | 0.0453 | 0.0004 | 0.0005 | 0.0014 | 0.0005 | 0.0018 | ○ | X |
| DR43 | 0.07 | 0.001 | 0.0152 | 0.0001 | 0.0006 | 0.0016 | 0.0001 | 0.0006 | ○ | ○ |
| DR44 | 0.03 | 0.0034 | 0.0345 | 0.0006 | <0.0001 | 0.0044 | 0.0005 | 0.0014 | X | ○ |
| DR45 | 0.07 | 0.001 | 0.0333 | 0.0001 | 0.0001 | 0.0097 | 0.0001 | 0.0013 | ○ | X |

TABLE 3

| Name of specimen | Rolling reduction rate at 700° C. or higher | 1 pass maximum reduction rate at 700° C. or higher | Rolling reduction rate at lower than 700° C. | 1 pass maximum reduction rate at lower than 700° C. | Decarburizing dew point(° C.) | Nitrified amount (wt %) | Diameter of crystal grains subjected to primary recrystallization annealing (μm) | Application of annealing separating agent | Removal of forsterite layer |
|---|---|---|---|---|---|---|---|---|---|
| DR1 | 85.90% | 57% | 79% | 48% | 48 | 0.025 | 29.8 | ○ | X |
| DR2 | 84.30% | 56% | 81% | 47% | 43 | 0.009 | 25.2 | X | X |
| DR3 | 99.90% | 43% | 61% | 35% | 62.2 | 0.02 | 37.7 | ○ | X |
| DR4 | 99.10% | 36% | 70% | 36% | 61.3 | 0.021 | 38.8 | ○ | X |
| DR5 | 90.90% | 53% | 79% | 43% | 49 | 0.026 | 28.5 | ○ | X |
| DR6 | 98.60% | 47% | 63% | 37% | 63.9 | 0.021 | 49.9 | ○ | X |
| DR7 | 90.80% | 58% | 84% | 48% | 76 | 0.001 | 25.1 | ○ | X |
| DR8 | 98.70% | 38% | 72% | 39% | 61.3 | 0.018 | 33.8 | ○ | |
| DR9 | 85.50% | 52% | 78% | 46% | 55 | 0.026 | 29.1 | ○ | ○ |
| DR10 | 97.50% | 47% | 71% | 42% | 56.5 | 0.024 | 34.6 | ○ | |
| DR11 | 89.70% | 53% | 75% | 46% | 47.1 | 0.021 | 24.6 | ○ | X |
| DR12 | 85.50% | 55% | 83% | 48% | 65.2 | 0.021 | 27.4 | ○ | X |
| DR13 | 90.00% | 57% | 78% | 46% | 46.4 | 0.024 | 25.1 | ○ | ○ |
| DR14 | 97.60% | 32% | 71% | 36% | 63.6 | 0.017 | 44.3 | ○ | X |
| DR15 | 88.40% | 51% | 83% | 49% | 40.2 | 0.006 | 27.9 | ○ | ○ |
| DR16 | 91.30% | 54% | 83% | 50% | 48 | 0.017 | 26.3 | ○ | ○ |
| DR17 | 86.80% | 56% | 80% | 48% | 57.3 | 0.008 | 25.3 | ○ | ○ |
| DR18 | 86.20% | 52% | 83% | 47% | 58.9 | 0.021 | 27.4 | ○ | ○ |
| DR19 | 89.00% | 53% | 74% | 42% | 33.6 | 0.007 | 28.2 | ○ | X |
| DR20 | 88.70% | 60% | 83% | 46% | 48 | 0.025 | 29.5 | X | X |
| DR21 | 98.50% | 36% | 63% | 35% | 56.2 | 0.02 | 46 | ○ | X |
| DR22 | 91.50% | 53% | 84% | 48% | 72 | 0.006 | 28.2 | ○ | X |
| DR23 | 89.20% | 56% | 76% | 42% | 53 | 0.035 | 28.6 | ○ | X |
| DR24 | 99.60% | 48% | 63% | 36% | 62.4 | 0.022 | 40.2 | X | X |
| DR25 | 86.40% | 52% | 81% | 47% | 42.3 | 0.024 | 27.1 | ○ | X |
| DR26 | 91.50% | 59% | 83% | 44% | 55.2 | 0.011 | 24.4 | ○ | X |
| DR27 | 83.90% | 58% | 75% | 44% | 49 | 0.007 | 26.6 | X | X |

TABLE 3-continued

| Name of specimen | Rolling reduction rate at 700° C. or higher | 1 pass maximum reduction rate at 700° C. or higher | Rolling reduction rate at lower than 700° C. | 1 pass maximum reduction rate at lower than 700° C. | Decarburizing dew point(° C.) | Nitrified amount (wt %) | Diameter of crystal grains subjected to primary recrystallization annealing (μm) | Application of annealing separating agent | Removal of forsterite layer |
|---|---|---|---|---|---|---|---|---|---|
| DR28 | 87.70% | 51% | 76% | 44% | 34.5 | 0.023 | 24.9 | ○ | ○ |
| DR29 | 86.10% | 53% | 79% | 41% | 64.4 | 0.016 | 50 | ○ | ○ |
| DR30 | 85.10% | 61% | 84% | 52% | 48 | 0.008 | 24.6 | X | X |
| DR31 | 90.00% | 62% | 83% | 44% | 48 | 0.024 | 29 | ○ | ○ |
| DR32 | 99.20% | 34% | 66% | 36% | 64.6 | 0.022 | 49.9 | ○ | ○ |
| DR33 | 97.90% | 39% | 71% | 43% | 60.4 | 0.019 | 35.5 | X | X |
| DR34 | 86.80% | 55% | 80% | 43% | 53.8 | 0.033 | 24.3 | ○ | ○ |
| DR35 | 91.00% | 53% | 82% | 50% | 40.8 | 0.004 | 28.2 | ○ | X |
| DR36 | 86.10% | 51% | 81% | 49% | 47 | 0.003 | 29.8 | X | ○ |
| DR37 | 86.50% | 51% | 81% | 48% | 48.2 | 0.01 | 27.9 | X | X |
| DR38 | 89.10% | 54% | 78% | 43% | 76 | 0.006 | 29.3 | ○ | X |
| DR39 | 98.40% | 35% | 71% | 42% | 63.6 | 0.022 | 44.7 | ○ | X |
| DR40 | 91.10% | 50% | 79% | 40% | 60.6 | 0.023 | 25.6 | X | X |
| DR41 | 88.30% | 55% | 77% | 46% | 48 | 0.002 | 28.5 | X | X |
| DR42 | 89.80% | 60% | 83% | 49% | 51 | 0.022 | 27 | ○ | X |
| DR43 | 91.00% | 53% | 80% | 48% | 53 | 0.015 | 25 | X | X |
| DR44 | 85.10% | 53% | 83% | 51% | 76 | 0.015 | 24.1 | X | X |
| DR45 | 89.50% | 53% | 80% | 46% | 48 | 0.007 | 24.9 | X | X |

TABLE 4

| Name of specimen | {100}<001> fraction (%) | {100}<025> fraction (%) | Thickness(mm) | Average crystal grain diameter (mm) | Rolling direction Br | Vertical direction Br | Circumference Br |
|---|---|---|---|---|---|---|---|
| DR1 | 41.9 | 2.7 | 0.37 | 18.06 | 1.587 | 1.528 | 1.505 |
| DR2 | 6.7 | 0.5 | 0.27 | 2.91 | 1.57 | 1.526 | 1.505 |
| DR3 | 87.2 | 8.1 | 0.51 | 42.86 | 1.818 | 1.801 | 1.633 |
| DR4 | 87.3 | 7.7 | 0.43 | 33.66 | 1.815 | 1.782 | 1.655 |
| DR5 | 31.5 | 1.2 | 0.39 | 13.61 | 1.568 | 1.52 | 1.513 |
| DR6 | 88.7 | 9.3 | 0.41 | 33.82 | 1.842 | 1.83 | 1.668 |
| DR7 | 40.9 | 2.6 | 0.36 | 17.48 | 1.591 | 1.528 | 1.538 |
| DR8 | 87.2 | 10.8 | 0.56 | 24.3 | 1.839 | 1.792 | 1.624 |
| DR9 | 11.7 | 0.6 | 0.71 | 4.9 | 1.612 | 1.576 | 1.566 |
| DR10 | 87.6 | 6.4 | 0.41 | 38.6 | 1.828 | 1.811 | 1.639 |
| DR11 | 11.4 | 0.5 | 0.73 | 4.87 | 1.604 | 1.548 | 1.533 |
| DR12 | 26.6 | 0.7 | 0.31 | 11.63 | 1.558 | 1.499 | 1.504 |
| DR13 | 4.5 | 0.5 | 0.73 | 1.92 | 1.601 | 1.544 | 1.523 |
| DR14 | 86.3 | 13.0 | 0.53 | 26.9 | 1.787 | 1.77 | 1.636 |
| DR15 | 20.9 | 2.5 | 0.33 | 9 | 1.589 | 1.53 | 1.503 |
| DR16 | 21.3 | 0.9 | 0.31 | 9 | 1.6 | 1.548 | 1.552 |
| DR17 | 15.7 | 1.4 | 0.49 | 6.61 | 1.6 | 1.557 | 1.556 |
| DR18 | 44.7 | 0.8 | 0.39 | 18.96 | 1.608 | 1.555 | 1.538 |
| DR19 | 40.9 | 2.6 | 0.34 | 17.63 | 1.569 | 1.511 | 1.53 |
| DR20 | 33.4 | 0.6 | 0.34 | 14.29 | 1.582 | 1.529 | 1.534 |
| DR21 | 88.2 | 10.3 | 0.57 | 56.97 | 1.828 | 1.818 | 1.663 |
| DR22 | 18.4 | 1.4 | 0.38 | 7.78 | 1.6 | 1.568 | 1.544 |
| DR23 | 35.3 | 0.8 | 0.75 | 14.77 | 1.615 | 1.577 | 1.561 |
| DR24 | 85 | 11.2 | 0.62 | 47.35 | 1.795 | 1.741 | 1.586 |
| DR25 | 46.8 | 2.0 | 0.71 | 19.66 | 1.612 | 1.566 | 1.564 |
| DR26 | 33.6 | 2.5 | 0.3 | 14.37 | 1.594 | 1.538 | 1.522 |
| DR27 | 39.9 | 2.6 | 0.32 | 17.01 | 1.591 | 1.542 | 1.539 |
| DR28 | 30.2 | 0.0 | 0.42 | 12.69 | 1.602 | 1.561 | 1.573 |
| DR29 | 29.7 | 0.3 | 0.75 | 12.63 | 1.603 | 1.563 | 1.523 |
| DR30 | 0.1 | 1.7 | 0.69 | 0.05 | 1.61 | 1.558 | 1.528 |
| DR31 | 30.2 | 1.7 | 0.36 | 12.84 | 1.596 | 1.55 | 1.535 |
| DR32 | 87.6 | 7.2 | 0.55 | 37.08 | 1.85 | 1.777 | 1.649 |
| DR33 | 85.4 | 11.4 | 0.6 | 38.97 | 1.786 | 1.75 | 1.604 |
| DR34 | 39.7 | 1.0 | 0.74 | 16.88 | 1.588 | 1.532 | 1.552 |
| DR35 | 24.4 | 2.4 | 0.69 | 10.13 | 1.613 | 1.577 | 1.591 |
| DR36 | 2.3 | 1.7 | 0.81 | 0.96 | 1.607 | 1.561 | 1.553 |
| DR37 | 33.3 | 2.6 | 0.38 | 13.98 | 1.61 | 1.574 | 1.552 |
| DR38 | 18.7 | 1.6 | 0.68 | 7.96 | 1.598 | 1.548 | 1.532 |

TABLE 4-continued

| Name of specimen | {100}<001> fraction (%) | {100}<025> fraction (%) | Thickness(mm) | Average crystal grain diameter (mm) | Rolling direction Br | Vertical direction Br | Circumference Br |
|---|---|---|---|---|---|---|---|
| DR39 | 89 | 9.3 | 0.52 | 22.31 | 1.846 | 1.83 | 1.681 |
| DR40 | 40.3 | 2.9 | 0.33 | 16.99 | 1.614 | 1.569 | 1.546 |
| DR41 | 4.7 | 0.6 | 0.34 | 1.99 | 1.613 | 1.568 | 1.532 |
| DR42 | 2.4 | 0.5 | 0.68 | 1.01 | 1.612 | 1.564 | 1.533 |
| DR43 | 13.9 | 1.9 | 0.36 | 5.82 | 1.613 | 1.559 | 1.579 |
| DR44 | 3.5 | 0.1 | 0.27 | 1.45 | 1.61 | 1.568 | 1.579 |
| DR45 | 8.4 | 2.0 | 0.69 | 3.56 | 1.608 | 1.558 | 1.555 |

As shown in Tables 1 to 4, the inventive examples in which the alloy composition of the present invention was satisfied and the reduction rate was appropriately adjusted had a large average crystal grain diameter and a high cube fraction, and thus, were confirmed to have excellent magnetism. However, the comparative examples in which the alloy composition of the present invention was not satisfied or the reduction rate was not appropriately adjusted were confirmed to have a small average grain, a low cube fraction, and poor magnetism.

The present invention is not limited to the implementations and/or the exemplary embodiments, but may be produced in various forms different from each other. A person with ordinary skill in the art to which the present invention pertains will understand that the present invention may be carried out in other specific forms without changing the technical idea or the essential feature of the present invention. Therefore, the implementations and/or the exemplary embodiments described above should be understood to be illustrative in all respects, and not to be restrictive.

REFERENCE SIGNS LIST

100: Double-oriented electrical steel sheet,
10: Steel sheet substrate,
11: Oxidation layer,
20: Forsterite layer
30: Insulating layer

The invention claimed is:

1. A double-oriented electrical steel sheet comprising, by weight: 2.0 to 4.0% of Si, 0.01 to 0.04% of Al, 0.0004 to 0.02% of S, 0.05 to 0.3% of Mn, 0.01% or less (exclusive of 0%) of N, 0.005% or less (exclusive of 0%) of C, 0.005 to 0.15% of P, 0.001 to 0.005% of Ti, 0.0001 to 0.005% of Ca, and 0.0001 to 0.005% of Mg, with a balance of Fe and other inevitable impurities, wherein an area fraction of crystal grains having an orientation within 15° or less from {100}<001> is 60 to 99%, and an area fraction of crystal grains having an orientation within 15° or less from {100}<025> is within 1 to 30%, wherein:

the double-oriented electrical steel sheet satisfies the following Equation 1:

$$10\times([Ti]+[Ca]+[Mg])\geq[Al]$$ [Equation 1]

wherein [Ti], [Ca], [Mg], and [Al] represent contents (wt %) of Ti, Ca, Mg, and Al, respectively.

2. The double-oriented electrical steel sheet of claim 1, further comprising:

one or more of 0.1 wt % or less of Sn, 0.001 to 0.1 wt % of Sb, and 0.01 to 0.2 wt % of Mo.

3. The double-oriented electrical steel sheet of claim 1, further comprising:

one or more of 0.01 wt % or less of Bi, 0.01 wt % or less of Pb, 0.01 wt % or less of As, 0.01 wt % or less of Be, and 0.01 wt % or less of Sr.

4. The double-oriented electrical steel sheet of claim 1, wherein:

an average crystal grain diameter is 20 times or more a thickness of the steel sheet.

5. The double-oriented electrical steel sheet of claim 1, wherein:

the double-oriented electrical steel sheet includes an oxide layer formed in a direction from a surface of a substrate to an interior of the substrate of the steel sheet and an insulating layer formed on the surface of the substrate.

6. The double-oriented electrical steel sheet of claim 5, wherein: the surface of the substrate and the insulating layer are in contact with each other.

7. The double-oriented electrical steel sheet of claim 5, wherein:

the double-oriented electrical steel sheet further includes a forsterite layer interposed between the surface of the substrate and the insulating layer.

8. The double-oriented electrical steel sheet of claim 1, wherein:

Br both in a rolling direction and in a rolling vertical direction is 1.65 T or more, Br in a circumferential direction is 1.58 T or more, and Br is calculated by the following Equation 2:

[Equation 2]

$Br=7.87/(7.87-0.065\times[Si]-0.1105\times[Al])\times B8$ wherein [Si] and [Al] represent contents (wt %) of Si and Al, respectively, and B8 represents strength (Tesla) of a magnetic field derived when maintained at 800 A/m.

* * * * *